(12) United States Patent  (10) Patent No.: US 7,091,690 B1
Oka et al.  (45) Date of Patent: Aug. 15, 2006

(54) POWER CONVERSION DEVICE

(75) Inventors: Toshiaki Oka, Tokyo (JP); Akihiko Kuroiwa, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 11/239,059

(22) Filed: Sep. 30, 2005

(30) Foreign Application Priority Data

Aug. 9, 2005 (JP) ............................. 2005-230290

(51) Int. Cl.
*H02P 1/24* (2006.01)
(52) U.S. Cl. ...................... 318/727; 318/801; 318/807; 318/812
(58) Field of Classification Search ................ 318/727, 318/807, 812, 254, 439, 138
See application file for complete search history.

(56) References Cited

U.S. PATENT DOCUMENTS

| | | | |
|---|---|---|---|
| 5,808,448 A * | 9/1998 | Naito | 322/13 |
| 5,859,521 A * | 1/1999 | Tajima et al. | 318/809 |
| 5,986,909 A | 11/1999 | Hammond et al. | |
| 6,166,514 A * | 12/2000 | Ando et al. | 318/811 |
| 6,437,997 B1 * | 8/2002 | Inarida et al. | 363/37 |
| 6,762,947 B1 | 7/2004 | Hammond | |
| 7,006,906 B1 * | 2/2006 | Kobayashi et al. | 701/22 |

FOREIGN PATENT DOCUMENTS

JP 7-20394 1/1995
JP 2543664 4/1997

* cited by examiner

*Primary Examiner*—Rina Duda
(74) *Attorney, Agent, or Firm*—Finnegan, Henderson, Farabow, Garrett & Dunner, L.L.P.

(57) ABSTRACT

A power conversion device is constituted by: a power converter that receives AC power and uses this to drive an AC motor; a control section for controlling an inverter section of the power converter; a voltage detection section that detects the voltage of the AC power source; a current detection section that detects the input current of the AC motor; and a speed detection section that detects the rotational speed of the AC motor. The control section has a vector control section that converts the current detected by the current detection section into a torque current component and an exciting current component orthogonal thereto and respectively independently controls these, and, when an electrical quantity found from the voltage detected by the voltage detection section has dropped below a first prescribed value, reduces the instruction value of the torque current component in a prescribed ratio in response to the lowered electrical quantity and, when the electrical quantity has dropped below a second prescribed value smaller than the first prescribed value, reduces the instruction value of the torque current component to zero.

6 Claims, 13 Drawing Sheets

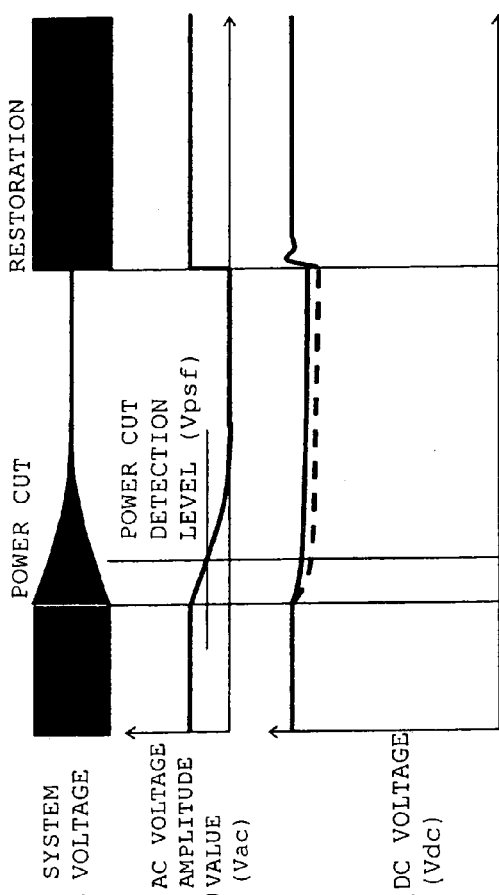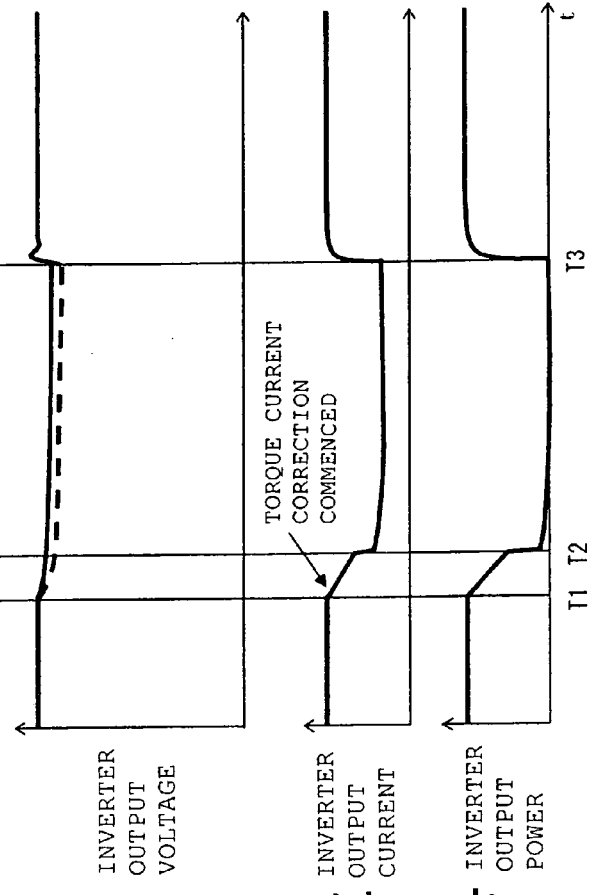

POWER CONVERSION DEVICE

CROSS REFERENCE TO RELATED APPLICATION

This application claims benefit of priority from Japanese application No. JP 2005-230290 filed Aug. 9th, 2005, the entire content of which is incorporated by reference herein.

BACKGROUND OF THE INVENTION

1. Field of the Invention

The present invention relates to a power conversion device capable of continuous operation of an AC motor in stable fashion even when there is a power cut (that is to say, blackout, outage, power failure or power interruption) of the AC power source for a short time or an instantaneous voltage drop (hereinbelow these will be referred to by the general term of instantaneous power cuts).

2. Description of the Related Art

AC motors typified by induction motors are now frequently driven by power conversion devices such as inverter devices. It has become common that, when an instantaneous power cut has occurred during operation of the inverter device, once operation of the inverter device has been stopped, the inverter device is restarted after restoration of power and operation of the AC motor is then continued by reconnecting the motor. However, in this case, the AC motor is free running during the instantaneous power cut, so its speed falls considerably. Also, in order to restart the motor, processing is required to again raise the voltage/frequency ratio from the vicinity of zero, so restarting takes some time, which is undesirable in terms of the load driven by the AC motor.

In this connection, in the case of an instantaneous power cut, the method is also available of restarting without stopping the output of the inverter device. In this case, if power continues to be supplied by the inverter device even after occurrence of the instantaneous power cut, the DC voltage rapidly decreases. There was therefore the risk of excess rush current due to recharging of the smoothing capacitor when power was restored in a condition in which the DC voltage had been decreased in this way. A further concern was overcharging of the smoothing capacitor due to resonance with the system impedance.

A countermeasure in respect of the above is a method wherein the output of the inverter device is not stopped when an instantaneous power cut occurs, but the AC motor is operated in a regenerative condition with the frequency level and the voltage level that are supplied thereto lowered at a prescribed rate, the frequency level and the voltage level being restored at a prescribed rate after power restoration. An example is to be found in issued Japanese Patent No. 2543664 "Method of controlling an AC motor".

A further technique that has been proposed is to control the frequency and voltage of the inverter device such that the torque current instruction becomes practically (substantially) zero when an instantaneous power cut occurs. An example is to be found in published Japanese Patent No. H. 7-20394 "Power conversion device".

With the technique disclosed in the former, the drop in DC voltage can be suppressed. However, there was the problem that, since the motor was deliberately controlled into the regenerative operation region, a greater drop in speed of the AC motor was experienced during the instantaneous power cut (blackout, outage or power failure) period than would have occurred in natural deceleration. A further problem was that time was required to raise the voltage in stable fashion to the normal operating condition after the voltage had been restricted in this way.

Also, with the technique disclosed in the latter, although the dropping in DC voltage can be suppressed so control during instantaneous power cut (blackout, outage or power failure) is comparatively easy, the inverter continues to supply power to the motor until the voltage falls below the level of the AC voltage drop, and, in addition, even if control of the torque current of the inverter is commenced as soon as the voltage falls below the level of the AC voltage drop, since there is a delay in response until the torque current is controlled to practically zero, the suppression of the reduction of the DC voltage was insufficient.

Accordingly, one object of the present invention is to provide a novel power conversion device wherein the reduction in the DC voltage during the period of an instantaneous power cut can be further suppressed and, after power recovery, restoration of the motor to the normal operating condition can be effected in a stable and rapid fashion.

SUMMARY OF THE INVENTION

In order to achieve the above object, a first aspect of the present invention is constituted as follows. Specifically, the first aspect of the invention comprises:

a power converter that converts the AC of an AC power source to AC of an arbitrary frequency so as to drive an AC motor;

a control section for controlling an inverter section of this power converter;

a voltage detection section that detects the voltage of the AC power source;

a current detection section that detects the input current of the AC motor; and a speed detection section that detects directly or indirectly the rotational speed of the AC motor, wherein beforementioned control section comprises a vector control or sensor-less control section that converts the current detected by the current detection section into a torque current component and an exciting current component orthogonal thereto and respectively independently controls these, and, when an electrical quantity found from the voltage detected by the voltage detection section has dropped below a first prescribed value, reduces the instruction value or limiting value of the torque current component in a prescribed ratio in response to the lowered electrical quantity and, when the electrical quantity has dropped below a second prescribed value smaller than the first prescribed value, reduces the instruction value or limiting value of the torque current component to zero.

Also, a second aspect of the present invention is constituted as follows. Specifically, the second aspect of the invention comprises:

a power converter that converts the AC of an AC power source to AC of an arbitrary frequency so as to drive an AC motor;

a control section for controlling an inverter section of the power converter;

a voltage detection section that detects the voltage of the AC power source; and a current detection section that detects the input current of the AC motor, wherein beforementioned control section comprises a frequency and voltage control section that controls the output frequency and output voltage of the inverter section in response to a frequency instruction; and an active current acquisition section that finds the active current from the current detected by the current detection section, wherein when an electrical quantity found from the voltage detected by the voltage detection section has dropped below a first prescribed value, the active current or its limiting value is reduced in a prescribed ratio in response to the lowered electrical quantity and, when this has dropped below a second prescribed value smaller than the first prescribed value from the voltage detected by said voltage detection section said active current or its limiting value is reduced to zero.

According to the present invention, the output torque current or active current of the inverter is suppressed in response to fall of the AC voltage, so a power conversion device can be provided wherein the reduction in the DC voltage during an instantaneous power cut period can be kept lower and wherein the normal operating condition can be restored in a stable and rapid fashion after power recovery.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 8A to FIG. 8F are operation time charts of a power conversion device according to the first embodiment of the present invention;

DETAILED DESCRIPTION OF THE PREFERRED EMBODIMENTS

Figure 1:
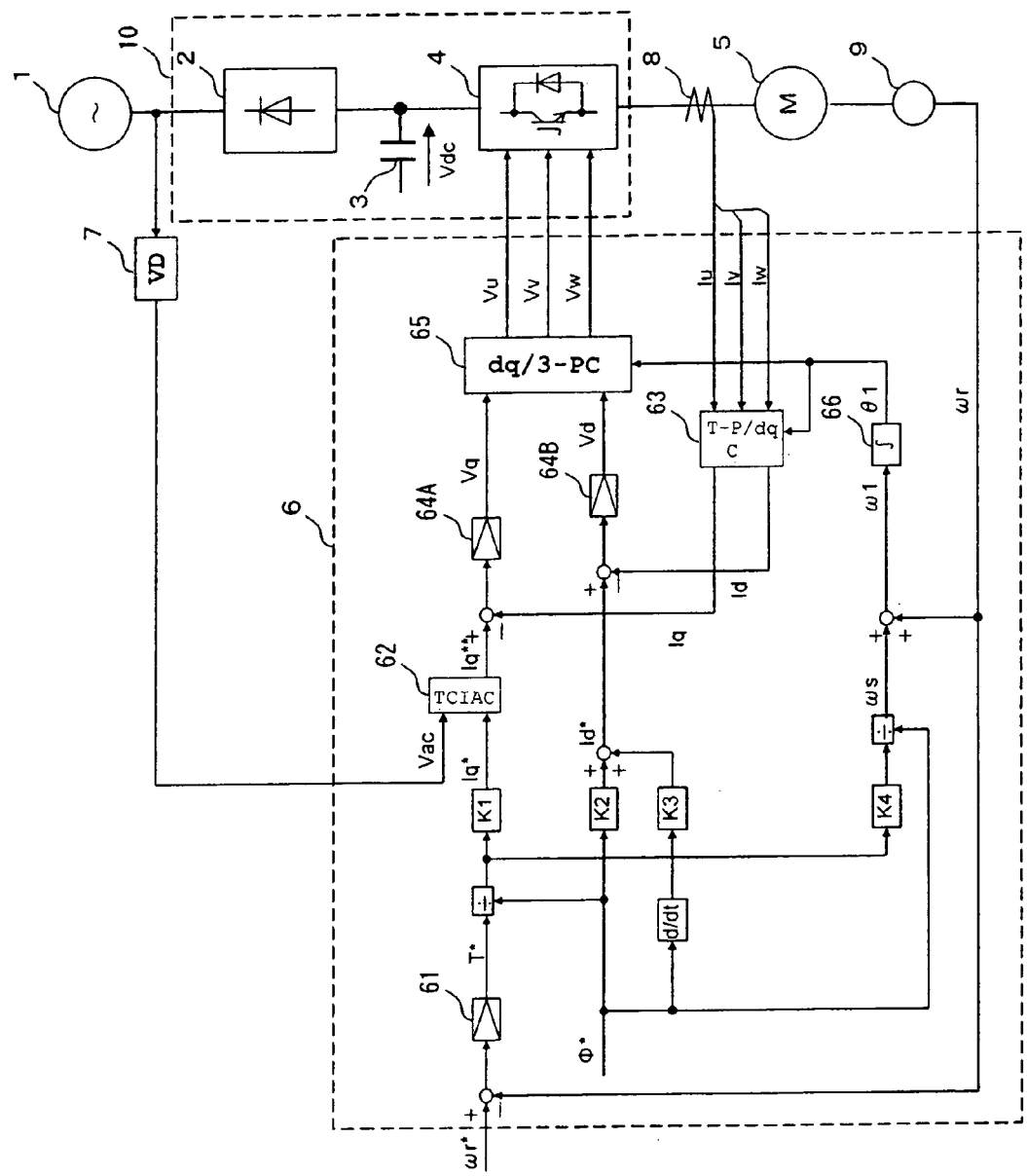
FIG. 1 is a block layout diagram of a power conversion device according to a first embodiment of the present invention.

Referring now to the drawings, wherein like reference numerals designate identical or corresponding parts throughout the several views, and more particularly to FIG. 1 and FIG. 8A to FIG. 8F thereof, one embodiment of the present invention will be described.

First Embodiment

FIG. 1 is a block layout diagram of a power conversion device according to a first embodiment of the present invention. AC that is supplied from an AC power source 1 is converted to DC by a converter 2. The converter 2 supplies DC to a smoothing capacitor 3. The inverter 4 converts the DC that is smoothed by this smoothing capacitor 3 to AC having a desired voltage and frequency, and this is used to drive the AC motor 5. This converter 2, smoothing capacitor 3 and inverter 4 form a power converter 10. This power converter is a so-called voltage type inverter device (or voltage source inverter device).

The inverter 4 comprises a main circuit (first circuit) constituted by bridge connected power semiconductor devices; these power semiconductor devices are controlled by control pulses from a control section (second circuit) 6. The input voltage of the converter 2 is detected by a voltage detector (VD) 7 and the AC voltage amplitude Vac, which is the detected signal thereof, is supplied to the control section 6. The output current of the inverter 4 i.e. the input current of the AC motor 5 is detected by a current detector 8 and this detection signal is supplied to the control section 6. Also, a speed detector 9 is mounted on the AC motor 5 and the detection signal of this speed detector 9 is also supplied to the control section 6.

The internal layout of the control section 6 is described below.

The speed signal ωr that is detected by the speed detector 9 is compared with a speed instruction ωr* that is supplied from outside the control section 6 and the torque instruction T* is adjusted using a speed controller 61 so that the deviation of the speed instruction ωr* and the speed signal ωr becomes zero. In contrast, the excitation instruction Φ* is normally maintained constant. The torque instruction T* is divided by the excitation instruction Φ* and multiplied by a coefficient to obtain the torque axis current instruction iq*. Also, the excitation instruction Φ* and its differentiated value are respectively multiplied by coefficients and added to thereby obtain an excitation axis current instruction id* that is orthogonal to the torque axis current instruction iq*.

The torque axis current instruction iq* is supplied to a torque current instruction adjustment circuit (TCIAC) 62, that will be described in detail later. This torque current instruction adjustment circuit 62 corrects this torque axis current instruction iq* in accordance with the value of the AC voltage amplitude value Vac detected by the voltage detector 7 and outputs a corrected torque axis current instruction Iq**.

The currents Iu, Iv and Iw of each phase detected by the current detector 8 are input to a three-phase/dq converter 63. This three-phase/dq converter (T-P/dqC) 63 converts the currents Iu, Iv and Iw to the torque axis current iq and excitation axis current Id, using the phase reference θ1, which is the output of an integrator 66, to be described, as reference. The torque axis voltage instruction Vq, which is the output of the torque axis current controller 64A, is then adjusted so that the deviation of this torque axis current Iq and the aforesaid torque axis current instruction iq* becomes zero. Likewise, the excitation axis voltage instruction Vd, which is the output of the excitation axis current controller 64B, is adjusted so that the deviation of the excitation axis current Id and the aforesaid excitation axis current instruction id* becomes zero. This torque axis current instruction Vq and excitation axis voltage instruction Vd are supplied to a dq/three-phase converter (dq/T-PC) 65.

In addition, the slip frequency ωs is found by dividing the torque instruction T* by the excitation instruction Φ* and multiplying by a coefficient to obtain a value which is then divided by the excitation instruction Φ* to obtain the slip frequency ωs. The output frequency ω1 that is output by the inverter 4 is then determined by adding the speed signal ωr detected by the speed detector 9 to this slip frequency ωs. The reference phase θ1 obtained by integrating this output frequency ω1 using the integrator 66 provides the conversion phase reference of the three-phase/dq converter 63 referred to above.

In addition, the torque axis voltage instruction Vq and excitation axis voltage instruction Vd are converted to three-phase by the dq/three-phase converter 65 described above, using this reference phase θ1, to find the output voltage references Vu, Vv and Vw. Gate pulses are then generated by modulating these output voltage references Vu, Vv and Vw by a PWM modulator or the like, not shown, and supplied to the power semiconductor devices of the inverter 4.

The technique described above of converting the input current of the AC motor 4 to the torque axis and excitation axis, which is orthogonal to this torque axis, and controlling these respectively independently, is well known as so-called "vector control".

Figure 2:
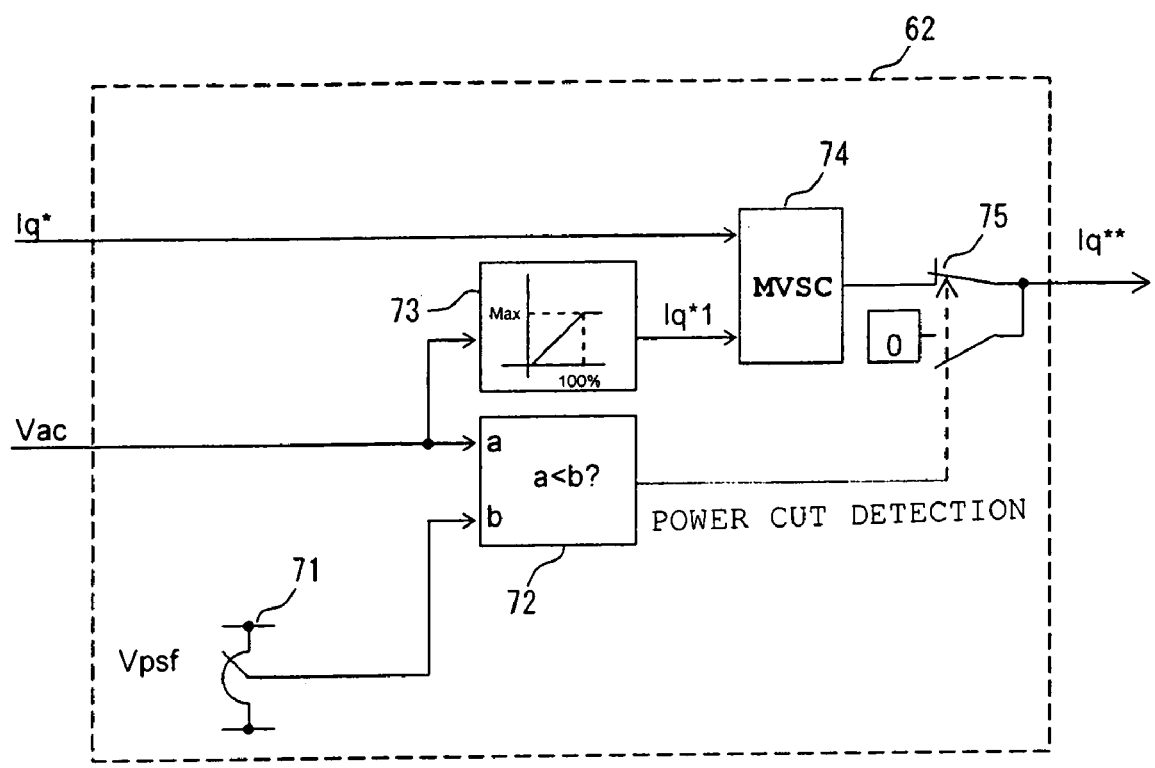
FIG. 2 is a block layout diagram showing an example of a torque current instruction adjustment circuit according to a second embodiment of the present invention.

FIG. 2 is an internal block layout diagram showing an example of the torque current instruction adjustment circuit (TCIAC) 62.

The torque current instruction adjustment circuit 62 inputs the AC voltage amplitude value Vac detected by the voltage detector 7 and the torque current instruction Iq* prior to correction. The power cut detection level Vpsf set in a power cut level setter 71 and the AC voltage amplitude value Vac are compared by the comparison circuit 72 and a power cut is detected when the AC power amplitude value Vac falls below the power cut detection level Vpsf. In addition, a torque current adjuster 73 outputs a torque current adjustment value Iq*1 that is proportional to the drop in the AC voltage amplitude Vac. A minimum value selection circuit (MVSC) 74 compares the torque current instruction Iq* prior to adjustment and the torque current adjustment value Iq*1 and selects the smaller of these values. If a power cut is not detected, a changeover switch 75 then outputs this smaller value as the corrected torque current instruction iq, but if a power cut is detected, outputs a zero signal as this corrected torque current instruction iq.

Figure 3:
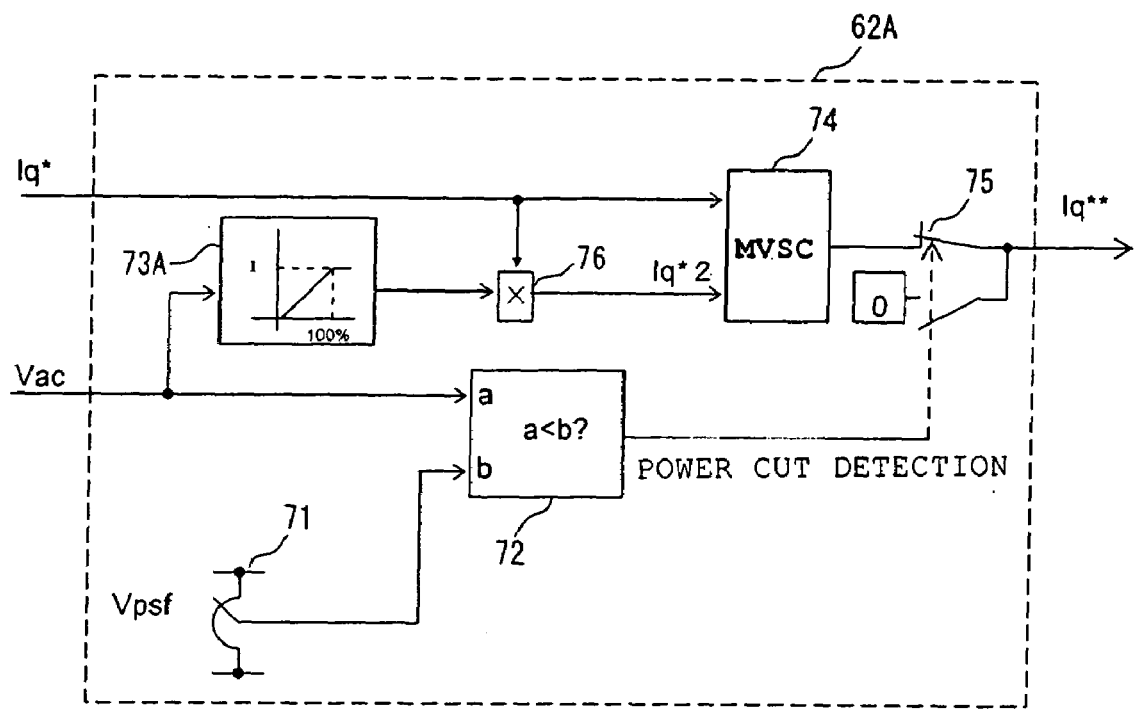
FIG. 3 it is a block layout diagram showing another example of a torque current instruction adjustment circuit according to the first embodiment of the present invention.

FIG. 3 is an internal block layout diagram showing another torque current instruction adjustment circuit 62A. In this FIG. 3, portions that are identical with those of the torque current instruction adjustment circuit 62 of FIG. 2 are given the same reference symbols and further description thereof is dispensed with. The aspect in which this torque current instruction adjustment circuit 62A differs from that of FIG. 2 is that a construction is adopted so that, taking the output of the torque current adjuster 73A as a ratio whose maximum is 1 (100%), a multiplier 76 is used to multiply the torque current instruction Iq* prior to adjustment by this ratio and then inputs this to a minimum value selection circuit (MVSC) 74 as a torque current adjustment value Iq*2.

The torque current adjustment value Iq*1 in the torque current instruction adjustment circuit 62 shown in FIG. 2 is for example the amount of voltage reduction with respect to a maximum value constituted by the rated torque current. This means that the torque current instruction adjustment circuit 62 has a function of reducing the torque limit in respect of a reduction of system voltage. In this respect, the torque current adjustment value Iq*2 in this torque current instruction adjustment circuit 62A of FIG. 3 is the amount of voltage reduction in respect of the torque current in the operating condition at this time point. Consequently, when the load of the AC motor 5 is light, even if the motor is in an operating condition in which the torque current is much smaller than the rated torque current, if it is preferable to reduce the corrected torque current instruction Iq**, this torque current instruction adjustment circuit 62A shown in FIG. 3 may be used.

FIG. 4 to FIG. 7 show an example circuit layout of the power converter 10 in FIG. 1.

Figure 4:
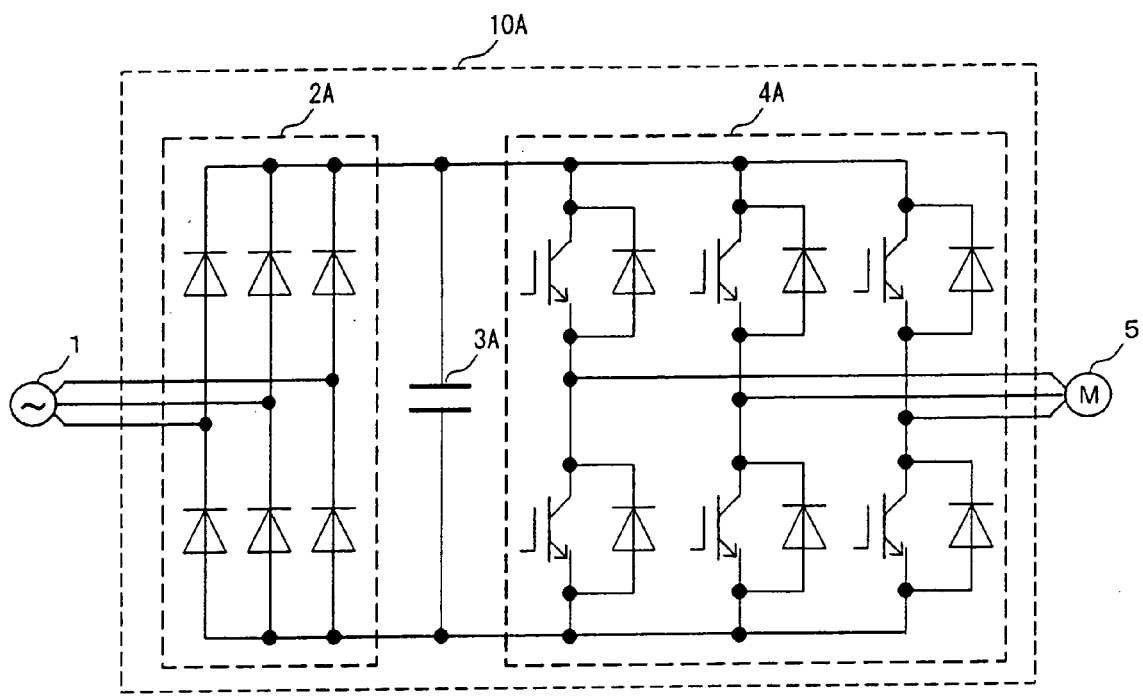
FIG. 4 is a block layout diagram of a first modified example of a power converter according to the present invention.

FIG. 4 is a circuit layout diagram of an ordinary two-level power converter 10A: this power converter 10A is a two-level voltage type inverter device comprising a converter 2A, smoothing capacitor 3A and three-phase inverter 4A.

It should be noted that suffixes are attached to the power converter 10 as 10A, 10B, 10C in view of the different functions thereof. The same applies to the converters 2, 2A, 2B and inverters 4, 4A, 4B, 4C etc.

Figure 5:
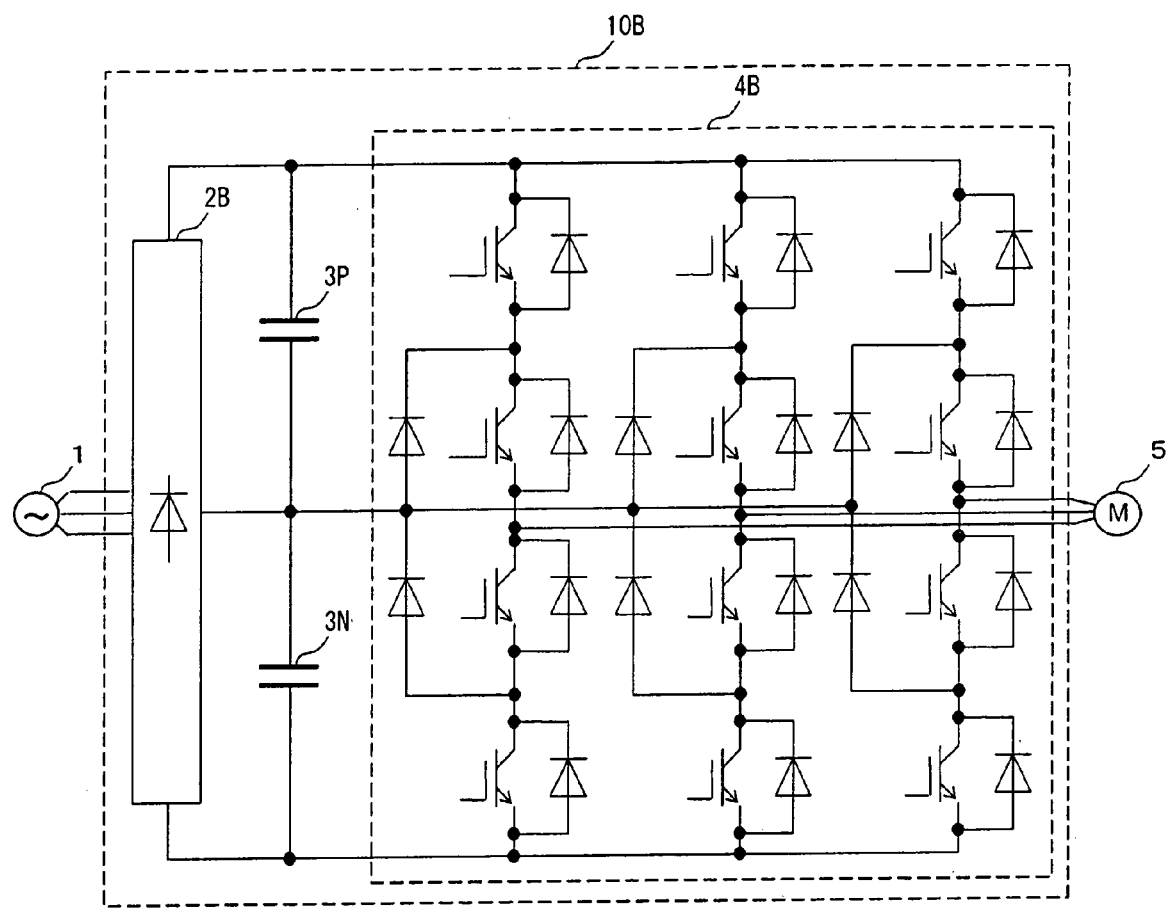
FIG. 5 is a block layout diagram of a second modified example of a power converter according to the present invention.

FIG. 5 is a circuit layout diagram of a three-level power converter 10B chiefly employed in a high-voltage high-capacity system. This three-level power converter 10B comprises a converter 2B that outputs three-level DC, smoothing capacitors 3P, 3N that smooth the respective positive and negative-side DC, and a three-level three-phase inverter 4B that outputs three-level voltage. The example of this FIG. 5 is an example of a three-level power converter, but a multi-level power converter having more voltage levels than this could be employed.

Figure 6:
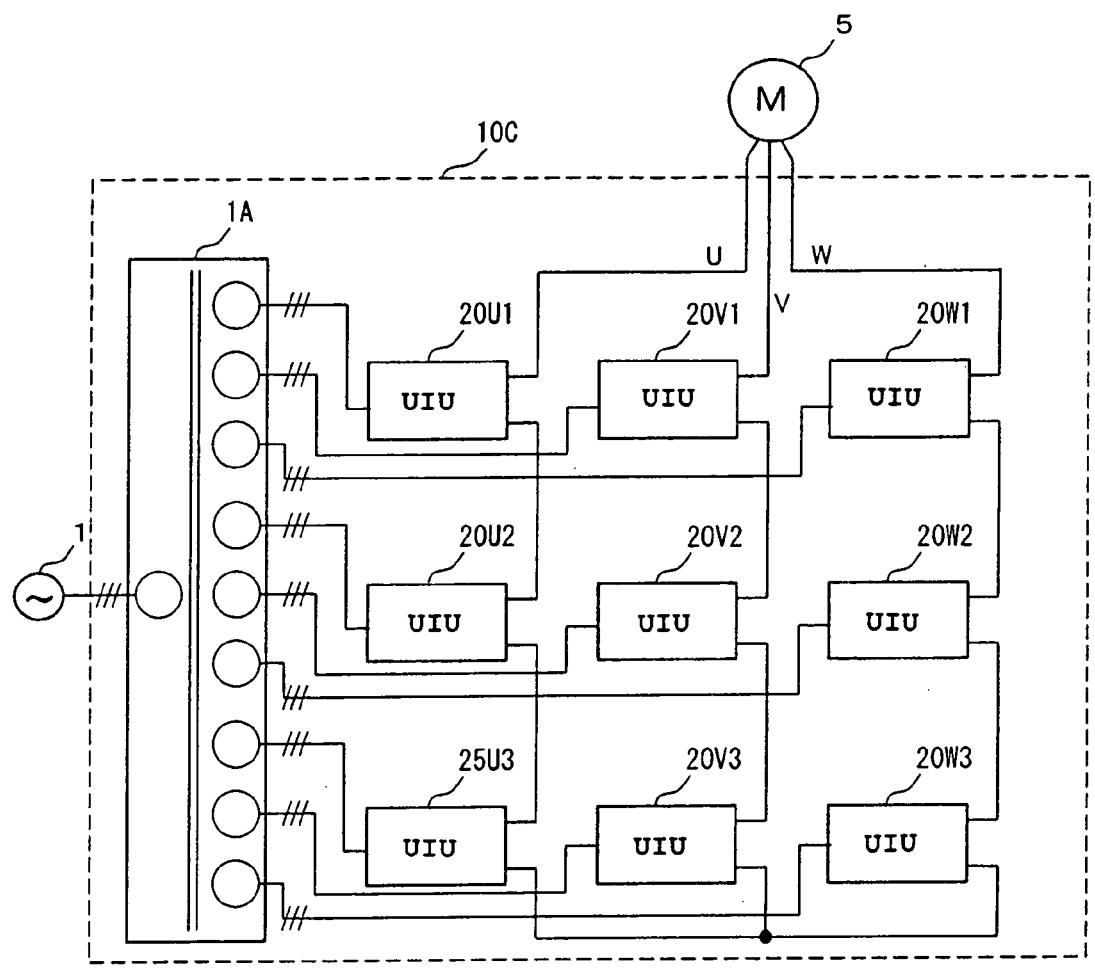
FIG. 6 is a block layout diagram of a third modified example of a power converter according to the present invention.
Figure 7:
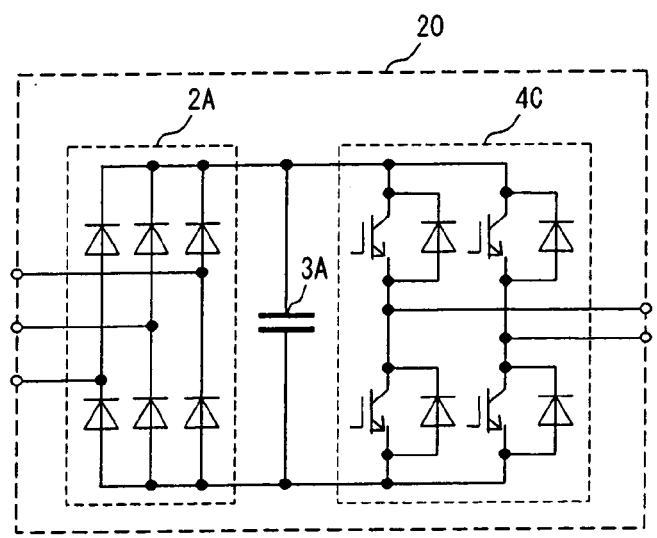
FIG. 7 is a block layout diagram of a unit converter applied to the third modified example of a power converter according to the present invention.

FIG. 6 and FIG. 7 are respectively circuit layout diagrams of a power converter 10C of multi-stage construction and a unit inverter unit (UIU) 20 used therein.

As shown in FIG. 7, the unit inverter unit 20 comprises a converter 2A, smoothing capacitor 3A and single-phase inverter 4C. The power converter 10C of multi-stage construction shown in FIG. 6 has a construction so that a plurality of secondary AC outputs isolated by means of input transformers 1A are obtained and unit inverter units 20U1, . . . , 20W3 are connected with these respective AC outputs; the single phase outputs of the single phase inverter units 20U1, 20U2 and 20U3 are connected in series, one terminal being a neutral point while the other terminal is the U phase output; the single phase outputs of the unit inverter units 20V1, 20V2 and 20V3 are likewise connected in series, one terminal being a neutral point while the other terminal is the V phase output; and the single phase outputs of the unit inverter units 20W1, 20W2 and 20W3 are connected in series, one terminal being a neutral point while the other terminal is the W phase output. This FIG. 6 shows a power converter of multi-stage construction in which each phase is of three-stage construction, but the number of stages is not restricted to three stages and could have any desired numerical value.

Next, the operation of a power conversion device according to a first embodiment of the present invention is described with reference to FIG. 8A to FIG. 8F. FIG. 8A to FIG. 8F are operation time charts of a power conversion device according to a first embodiment of the present invention. These FIG. 8A to FIG. 8F show the waveforms at the various locations when voltage drop is generated in the system voltage at the time point t=T1 and when at time point t=T2 the voltage has dropped to the power cut detection level; and when at the time point T3, the voltage has recovered.

The system voltage starts to drop at the time point t=T1. The AC voltage amplitude value Vac is the result of detecting the amplitude of the system voltage and so starts to fall at the time point t=T1. At the time point t=T2, the AC voltage amplitude value Vac reaches the power cut detection level Vpsf referred to above.

At time point t=T1, the torque current adjuster 73 of the torque current instruction adjustment circuit 62 referred to above, or the torque current adjuster 73A of the torque current instruction adjustment circuit 62A, is actuated, commencing the operation of correcting the torque current instruction Iq to the corrected torque current instruction Iq. In this way, as illustrated, the inverter output current and inverter output power start to decrease. With the voltage drop at the time point t=T1, the DC voltage Vdc and the inverter output voltage also start to decrease. This decrease of the voltage depends on the degree of diminution of the system voltage, but the rate of this decrease is larger as the power provided by the energy stored on the smoothing capacitor 3 being supplied to the AC motor 5** increases. It should be noted in FIG. 8C and FIG. 8D that, since the inverter output current is reduced from the time point t=T1, as shown by the broken line, the DC voltage Vdc and inverter output voltage show a much gentler rate of decrease compared with the rate of decrease that would be displayed by the DC voltage Vdc and inverter output voltage if this reduction action were not performed.

At the time point t=T2, the AC voltage amplitude value Vac reaches the power cut detection level Vpsf mentioned above. At this point, due to the action of the torque current instruction adjustment circuit 62 or 62A, the corrected torque current instruction Iq becomes zero. The inverter output current and inverter output voltage therefore rapidly reach zero. When the inverter output power becomes zero in this way, the energy stored on the smoothing capacitor 3 is held, so the DC voltage Vdc and inverter output voltage are held in their existing conditions. It should be noted that, although, in the above description, it was assumed that the corrected torque current instruction Iq was zero, there is no need for this to be strictly zero and it could of course be a value close to zero.

When, at time point t=T3, power is restored, the inverter commences operation and the inverter output current and inverter output power rise to their condition prior to the power cut with the predetermined response speed. In this process, the DC voltage and inverter output voltage show an oscillatory waveform for reasons such as resonance with the system impedance, but, since the slump in the DC voltage according to the present invention is controlled to the minimum, the degree of such resonance is slight. Smooth restarting can thereby be achieved.

It should be noted that although, in the above description, consideration may also be given to performing the detection of voltage drop at the time point t=T1 in terms of the DC voltage Vdc rather than the AC voltage amplitude value, since the chief focus of the present invention is to protect against power cuts by rapidly detecting voltage drop, it is undesirable to employ the DC voltage, as this involves delay in detection.

Second Embodiment

Figure 9:
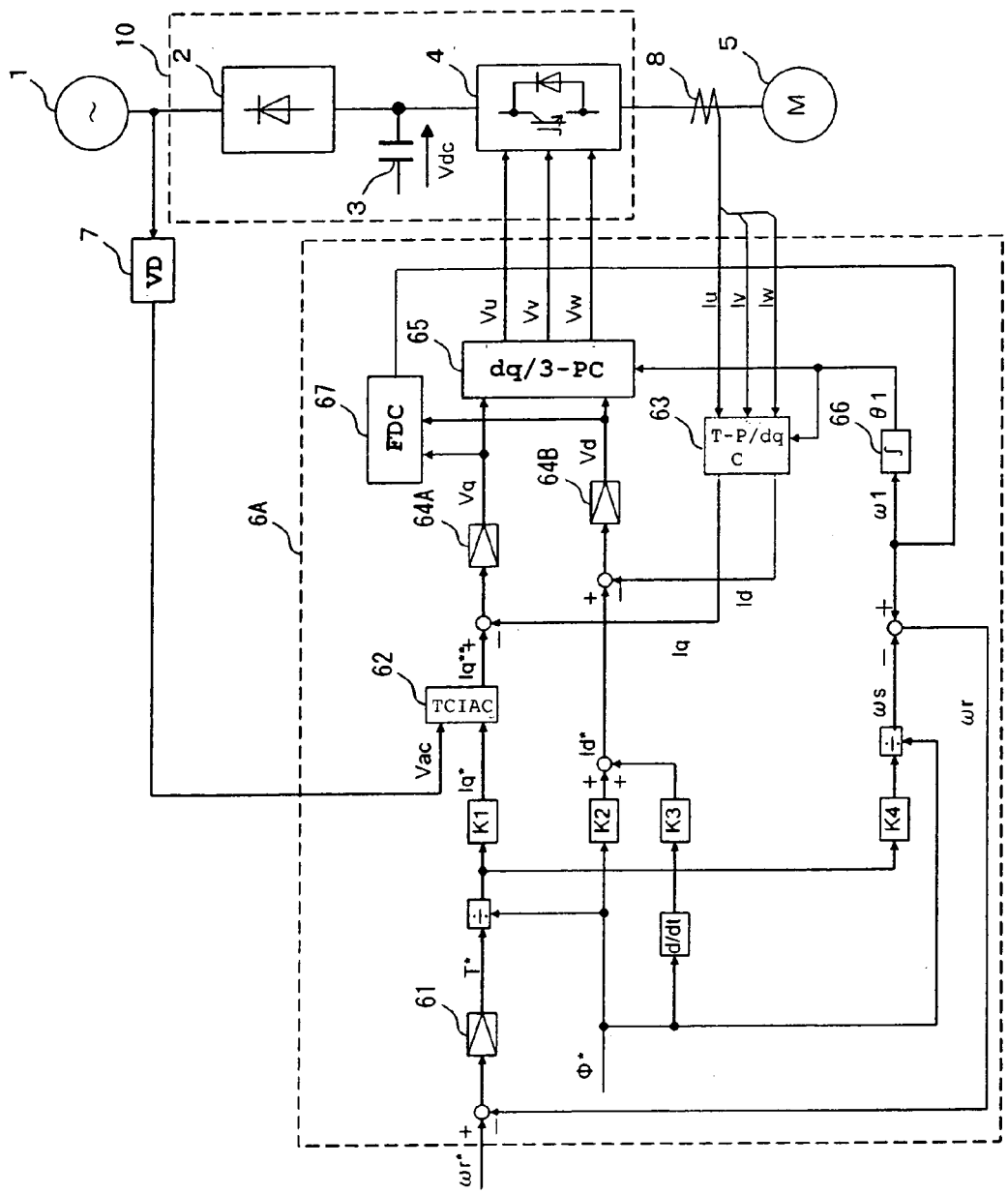
FIG. 9 is a block layout diagram of a power conversion device according to the second embodiment of the present invention.

FIG. 9 is a block layout diagram of a power conversion device according to a second embodiment of the present invention. In this second embodiment, parts which are the same as parts in the block layout diagram of the power conversion device according to the first embodiment of FIG. 1 are given the same reference symbols and further description thereof is dispensed with. The difference points of this second embodiment from the first embodiment lie in that a construction is adopted whereby, instead of a speed detector 9, there is provided a frequency deduction circuit 67 that inputs the torque axis voltage instruction Vq and excitation axis voltage instruction Vd in the control section 6A and deduces the output frequency of the inverter 4; in that the output of this frequency deduction circuit (FDC) 67 is supplied to an integrator 66; and in that the speed signal ωr that is deduced by subtracting the slip frequency ωs from the output of the frequency deduction circuit 67 is input to the speed controller 61.

As is well known, the speed signal ωr can be deduced by employing a frequency deduction circuit 67 as shown in FIG. 9, even without using a speed detector 9 as shown in FIG. 1. Thus, even in a power conversion device having a so-called sensor-less vector control system, the present invention makes it possible to provide a power conversion device wherein the decrease in DC voltage during the period of an instantaneous power cut can be further suppressed and wherein the normal operating condition can be recovered in a stable and rapid fashion after power restoration.

Third Embodiment

Figure 10:
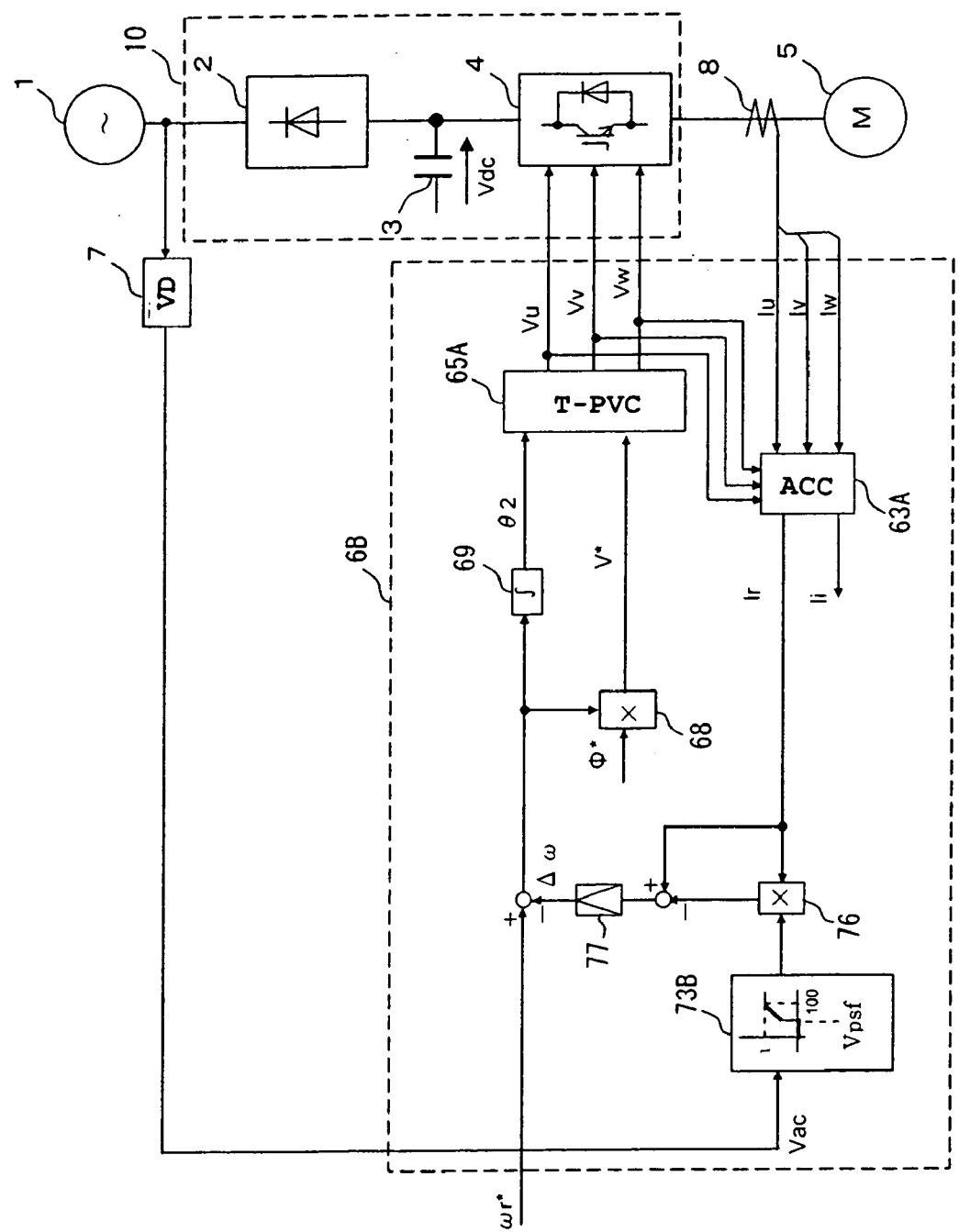
FIG. 10 is a block layout diagram of a power conversion device according to a third embodiment of the present invention.

FIG. 10 is a block layout diagram of a power conversion device according to a third embodiment of the present invention. In this third embodiment, parts which are the same as parts in the block layout diagram of the power conversion device according to the first embodiment of FIG. 1 are given the same reference symbols and further description thereof is dispensed with. The difference of this third embodiment from the first embodiment lies in that, within the control section 6B, so-called V/f control is adopted rather than vector control.

The internal layout of the control section 6B is described below.*

The speed reference ωr* and the excitation instruction Φ* that are given from outside are calculated by a voltage instruction calculator 68, to obtain the voltage instruction V* for one phase. The output voltage references Vu, Vv and Vw are then obtained by converting this voltage instruction V* to three-phase using a three-phase voltage converter (T-PVC) 65A, using as a reference the reference phase θ1 obtained by integrating the speed reference ωr*, using an integrator 69. Gate pulses are generated by modulating these output voltage references Vu, Vv and Vw by for example a PWM modulator, not shown, and supplied to the power semiconductor devices of the inverter 4 in the same way as in the case of the first embodiment.

The currents Iu, Iv and Iw of each phase detected by the current detector 8 are input to an active current converter 63A. This active current converter (ACC) 63A outputs active current Ir and reactive current Ii from the phases of the aforesaid output voltage references Vu, Vv and Vw.

Also, the AC voltage amplitude value Vac detected by the voltage detector (VD) 7 is input to an active current adjuster 73B. Like the torque current adjuster 73A shown in FIG. 3, this active current adjuster 73B outputs 1 (100%) at the maximum. The value obtained by using a multiplier 76 to multiply the active current Ir with the output of this active current adjuster 73B is then subtracted from the active current Ir and supplied to a correction controller 77, which corrects the speed reference ωr* by subtracting a frequency correction value Δω, which is the output of this correction controller 77, from the speed reference ωr*. If it is arranged for the active current adjuster 73B to output zero when the AC voltage amplitude value Vac has fallen below the power cut detection level Vpsf, control to make the active current Ir zero can be performed simultaneously with power cut detection.

As described above, even if the inverter 4 does not perform vector control, by exercising control so that the active current Ir decreases in response to fall of the system voltage, it is possible to provide a power conversion device wherein the decrease of the DC voltage during the period of an instantaneous power cut can be suppressed to low-level and wherein return to the normal operation condition can be effected in a stable and a rapid fashion after power restoration.

Fourth Embodiment

A power conversion device according to a fourth embodiment of the present invention is described below with reference to FIG. 11 and FIG. 12.

Figure 11:
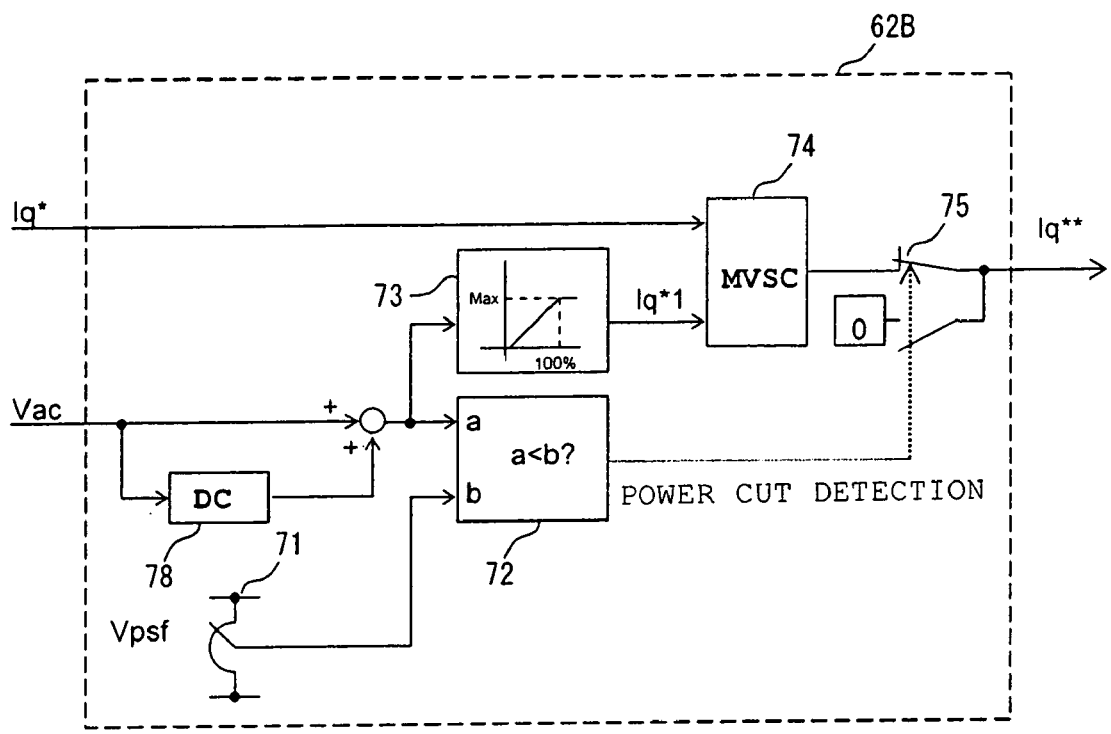
FIG. 11 is a block layout diagram of a torque current instruction adjustment circuit of a power conversion device according to a fourth embodiment of the present invention.
Figure 12:
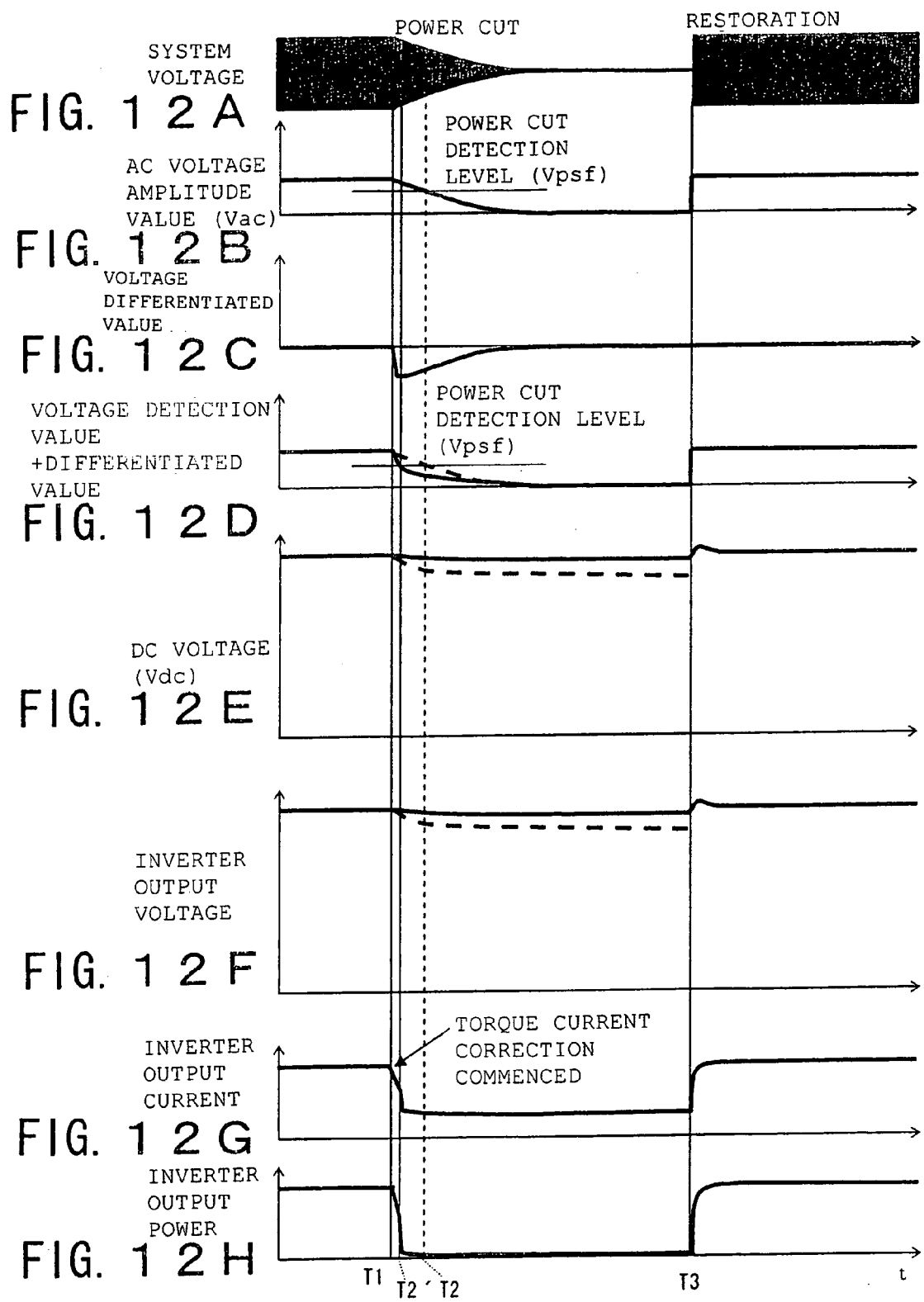
FIG. 12A to FIG. 12H are operation time charts of a power conversion device according to the fourth embodiment of the present invention.

FIG. 11 is a block layout diagram of a torque current instruction adjustment circuit 62B of a power conversion device according to a fourth embodiment of the present invention. In this fourth embodiment, parts which are the same as parts in the block layout diagram of the torque current instruction adjustment circuit of the power conversion device according to the first embodiment in FIG. 2 are given the same reference symbols and further description thereof is dispensed with. The difference of this fourth embodiment from the first embodiment lies in that a differentiation circuit (DC) 78 is provided that inputs the AC current amplitude value Vac and supplies a value obtained by adding the output of this differentiation circuit 78 to the AC current amplitude value Vac to the torque current adjuster 73 and a comparison circuit (comparator) 72.

The operation of this fourth embodiment is described below with reference to FIG. 12.

FIG. 12A to FIG. 12H are operation time charts of a power conversion device according to a fourth embodiment of the present invention. In the same way as the time charts of FIG. 4 in the first embodiment, these FIG. 12A to FIG. 12H show the waveforms at the various locations when voltage drop is generated at the time point t=T1 and when at time point t=T2 the voltage has dropped to the power cut detection level Vpsf; and when at the time point T3, the voltage has recovered.

When, at time point at t=T1, voltage drop of the AC voltage amplitude value Vac has commenced, a voltage differentiated value is generated, depending on the degree of this drop, and, as shown in Figure, the AC voltage amplitude value+voltage differentiated value rapidly drops compared with the AC voltage amplitude value Vac in the case where there is no differentiation circuit, as shown by the broken lines. Accompanying this, the diminution of the inverter output current and inverter output power become steep.

In addition, the point when the power cut detection level Vpsf is reached is changed from the conventional time point t=T2 to a time point t=T2' i.e. the time until power cut detection is performed after the voltage starts to drop is greatly decreased. In this way, as shown in the Figure, the slump in the DC voltage and inverter output voltage is greatly ameliorated from the conventional values shown by the broken lines, being considerably decreased.

As described above, if the torque current instruction is controlled with a value obtained by adding the voltage differentiated value to the AC voltage amplitude value Vac, the decrease of the torque current instruction can be speeded up to an extent that increases with increase in the speed of drop of the system voltage; the drop in DC voltage can therefore be suppressed.

Fifth Embodiment

A power conversion device according to a fifth embodiment of the present invention is described below with reference to FIG. 13 and FIG. 14.

Figure 13:
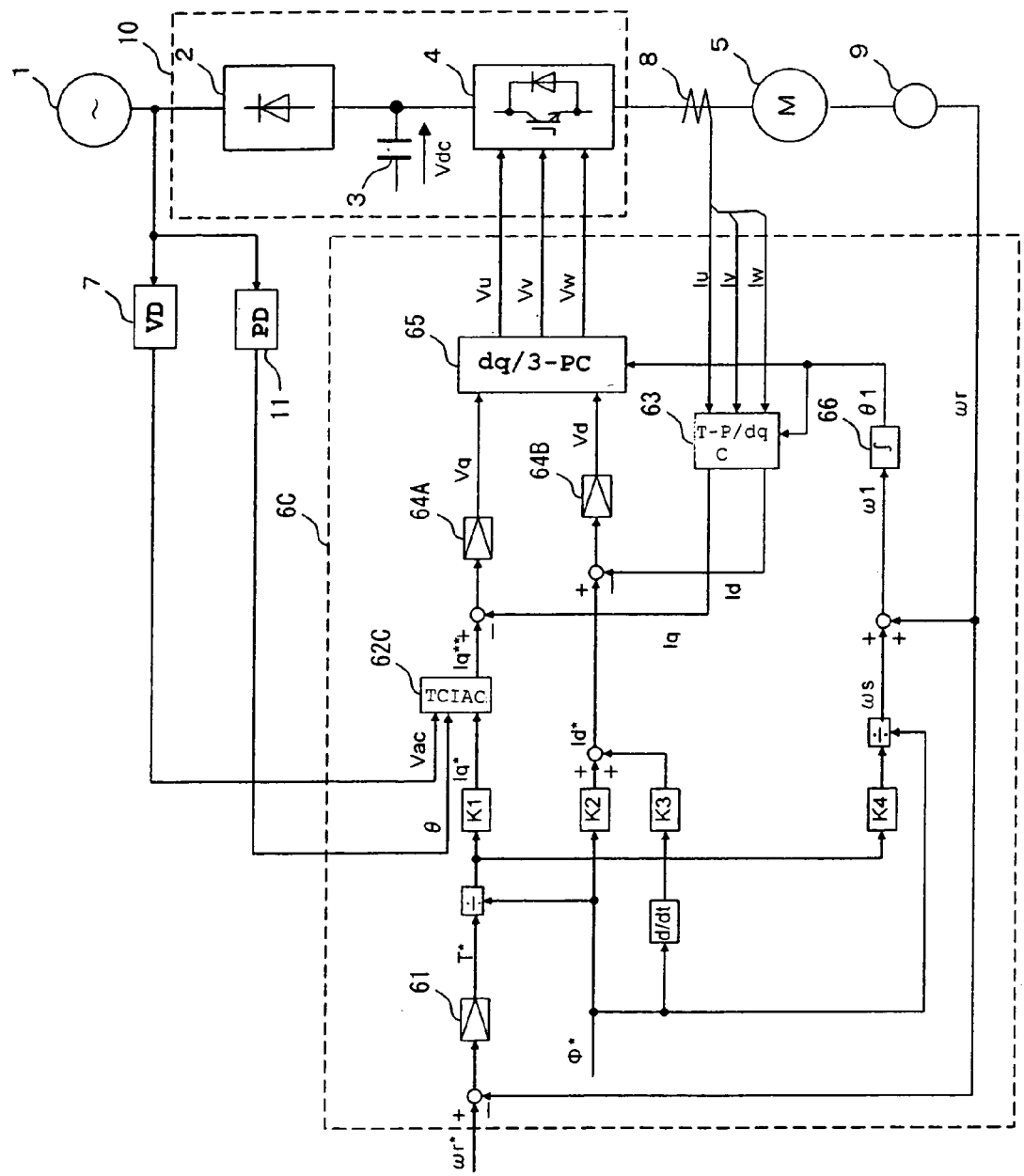
FIG. 13 is a block layout diagram of a power conversion device according to a fifth embodiment of the present invention.

FIG. 13 is a block layout diagram of a power conversion device according to a fifth embodiment of the present invention. In this fifth embodiment, parts which are the same as parts in the block layout diagram of the power conversion device according to the first embodiment in FIG. 1 are given the same reference symbols and further description thereof is dispensed with. The difference of the fifth embodiment from the first embodiment lies in that a power source phase detection circuit 11 is provided, the output thereof being supplied to a torque current instruction adjustment circuit 62C of a control section 6C.

Figure 14:
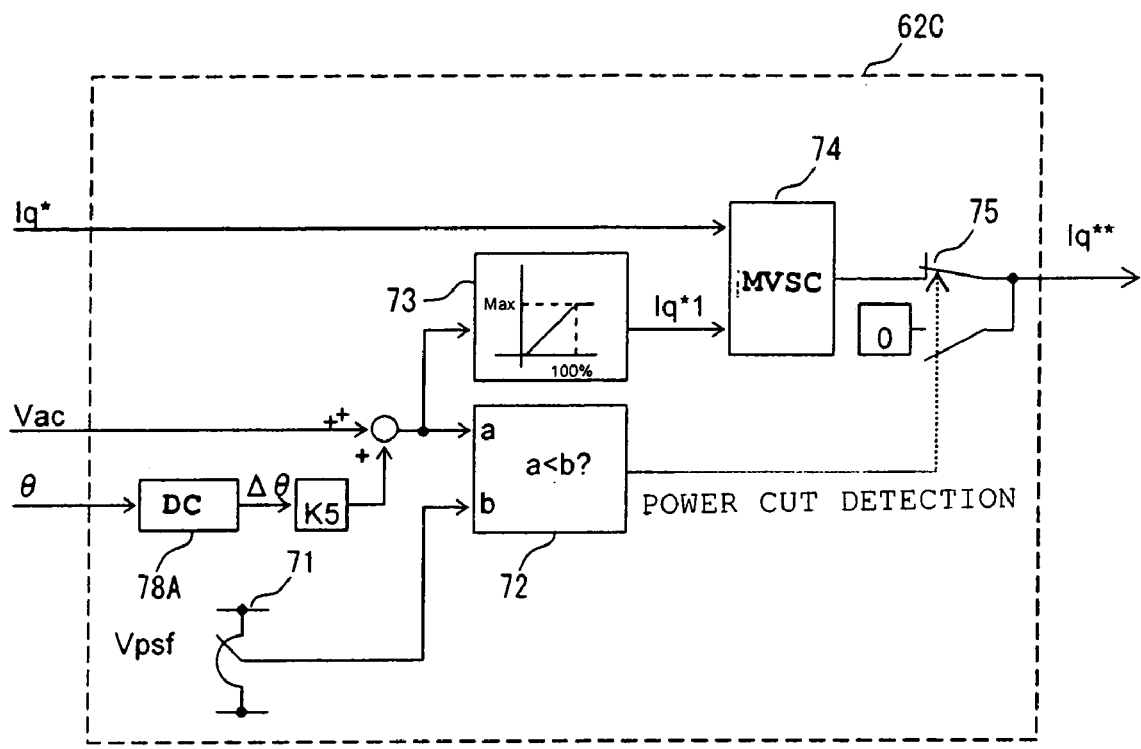
FIG. 14 is a block layout diagram showing a torque current instruction conversion circuit according to the fifth embodiment of the present invention.

FIG. 14 is a block layout diagram of a torque current instruction adjustment circuit of a power conversion device according to the fifth embodiment of present invention. In this fifth embodiment, parts which are the same as parts in the block layout diagram of the torque current instruction adjustment circuit of the power conversion device according to the first embodiment in FIG. 2 are given the same reference symbols and further description thereof is dispensed with. The difference of this fifth embodiment from the first embodiment lies in that the output phase θ of the power source phase detection circuit 11 is differentiated by the differentiation circuit 78A, and this output Δθ is multiplied by a coefficient and added to the AC voltage amplitude value Vac to obtain a value which is supplied to the torque current adjuster 73 and comparison circuit 72.

If the torque current instruction is controlled in this way by a value obtained by adding a differentiated value Δθ of the output phase θ to the AC voltage amplitude value Vac, it becomes possible to decrease the torque current instruction with a rapid response even in the case of phase interruption of the system voltage and it therefore becomes possible to suppress the drop in the DC voltage.

Obviously, numerous additional modifications and variations of the present invention are possible in light of the above teachings. It is therefore to be understood that within the scope of the appended claims, the present invention may be practiced otherwise than as specially described herein.

What is claimed is:

1. A power conversion device comprising:
   a power converter that converts an AC of an AC power source to an AC with an arbitrary frequency so as to drive an AC motor;
   a control section that controls an inverter section of said power converter;

a voltage detection section that detects a voltage of said AC power source;

a current detection section that detects an input current of said AC motor; and a speed detection section that detects directly or indirectly a rotational speed of said AC motor, wherein said control section comprises a vector control section that converts a current detected by said current detection section into a torque current component and an exciting current component orthogonal thereto and respectively independently controls said torque current component and exciting current component, when an electrical quantity found from said voltage detected by said voltage detection section drops below a first predetermined value, said control section reduces an instruction value or limiting value of said torque current component in a predetermined ratio in response to a lowered electrical quantity and, when said electrical quantity drops below a second prescribed value smaller than said first predetermined value, said control section reduces said instruction value or limiting value of said torque current component to zero.

2. A power conversion device comprising:

a power converter that converts an AC of an AC power source to AC with an arbitrary frequency so as to drive an AC motor;

a control section that controls an inverter section of said power converter;

a voltage detection section that detects a voltage of said AC power source; and a current detection section that detects an input current of said AC motor; and a speed detection section that detects directly or indirectly a rotational speed of said AC motor, wherein said control section comprises a sensor-less control section that converts a current detected by said current detection section into a torque current component and an exciting current component orthogonal thereto and respectively independently controls said torque current component and exciting current component, when an electrical quantity found from said voltage detected by said voltage detection section drops below a first prescribed value, said control section reduces said instruction value or limiting value of said torque current component in a prescribed ratio in response to a lowered electrical quantity and, when said electrical quantity drops below a second prescribed value smaller than said first prescribed value, said control section reduces said instruction value or limiting value of said torque current component to zero.

3. A power conversion device comprising:

(1) a power converter that converts an AC of an AC power source to AC with an arbitrary frequency so as to drive an AC motor;

(2) a control section that controls an inverter section of said power converter;

(3) a voltage detection section that detects a voltage of said AC power source; and (4) a current detection section that detects an input current of said AC motor;

wherein said control section comprises (a) a frequency and voltage control section that controls an output frequency and output voltage of said inverter section in response to a frequency instruction; and (b) an active current acquisition section that finds an active current from a current detected by said current detection section, wherein when an electrical quantity found from said voltage detected by said voltage detection section drops below a first predetermined value, said active current or a limiting value thereof is reduced in a predetermined ratio in response to a lowered electrical quantity and, when said electrical quantity drops below a second prescribed value smaller than said first prescribed value from said voltage detected by said voltage detection section said active current or limiting value is reduced to zero.

4. The power conversion device according to claim 1, claim 2 or claim 3, wherein said electrical quantity is an amplitude value of said voltage detected by said voltage detection section.

5. The power conversion device according to claim 1, claim 2 or claim 3, wherein said electrical quantity is a value obtained by adding in a predetermined ratio said amplitude value of said voltage detected by said voltage detection section and an amount of change with time of said voltage detected by said voltage detection section.

6. The power conversion device according to claim 1, claim 2 or claim 3, further comprising a voltage phase change amount detection section that detects an amount of change with time of a voltage phase of said voltage detected by said voltage detection section, wherein said electrical quantity is a value obtained by adding in a predetermined ratio an amplitude value of said voltage detected by said voltage detection section and an amount of change with time of a voltage phase detected by said voltage phase change amount detection section.

* * * * *